Feb. 1, 1938. T. J. SALSMAN ET AL 2,107,217
ART OF BOOKBINDING
Filed Aug. 6, 1936 5 Sheets-Sheet 4
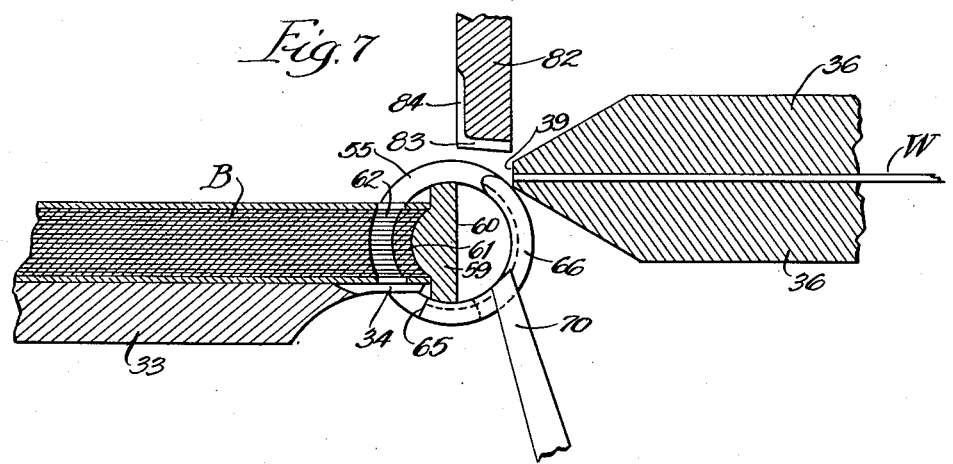
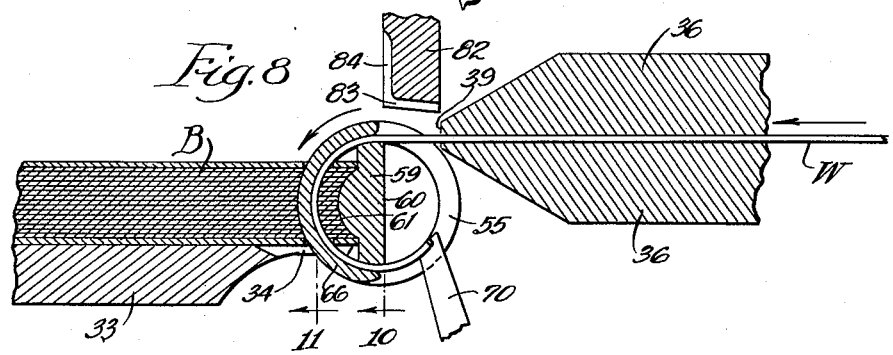
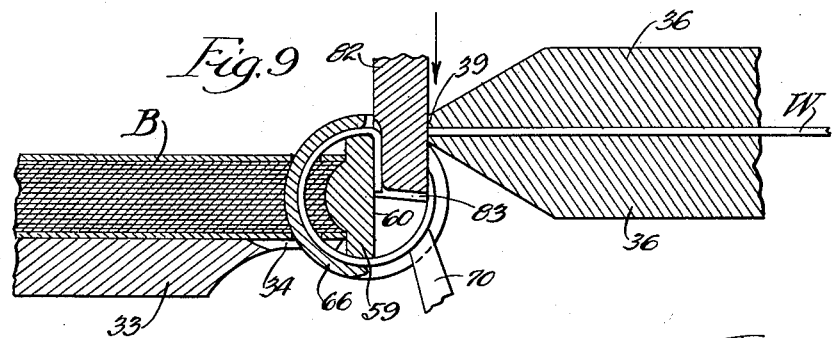
Inventors:
Thomas J. Salsman
and John M. Marchok.
By Kemmy & Kemmy
Attys.

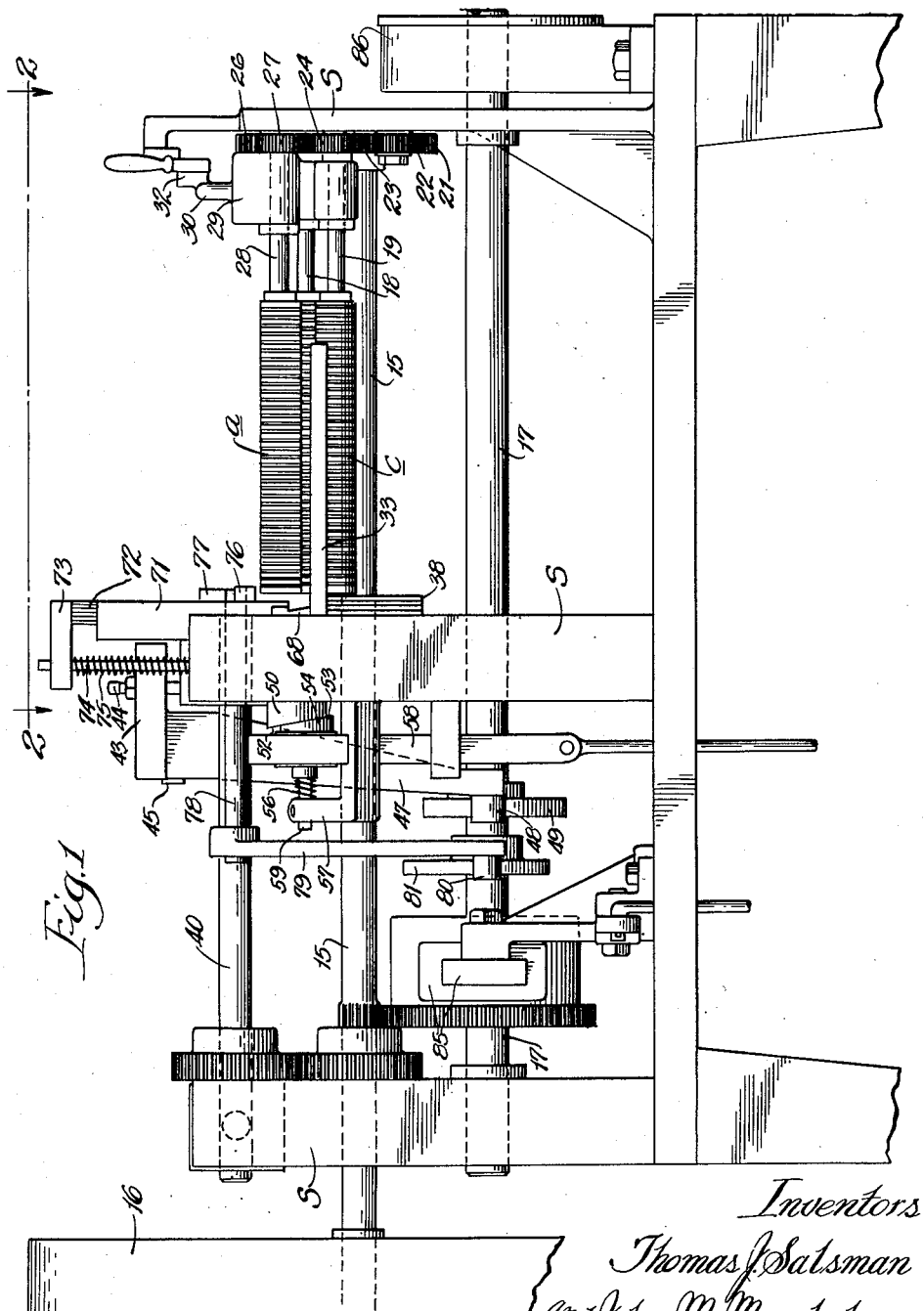

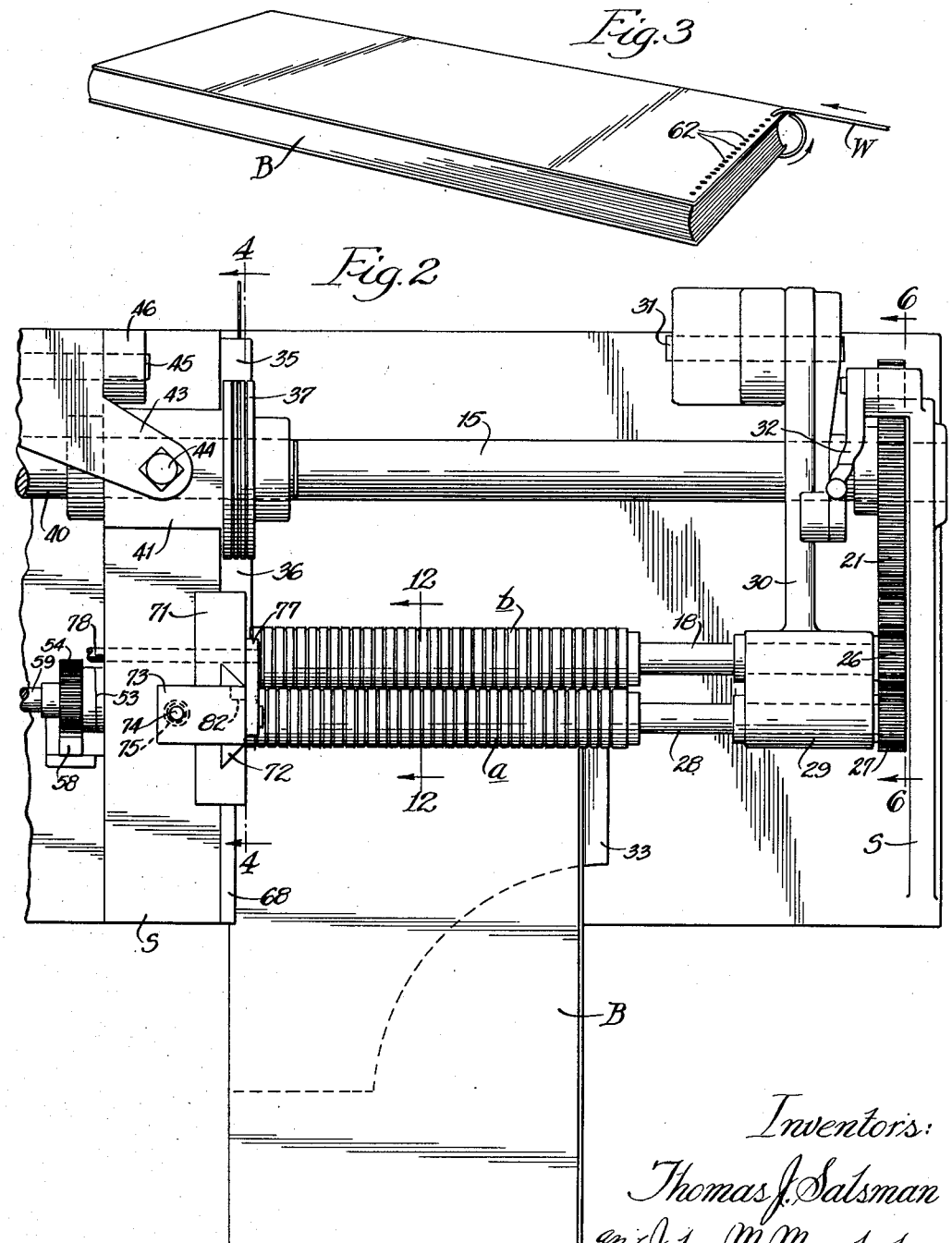

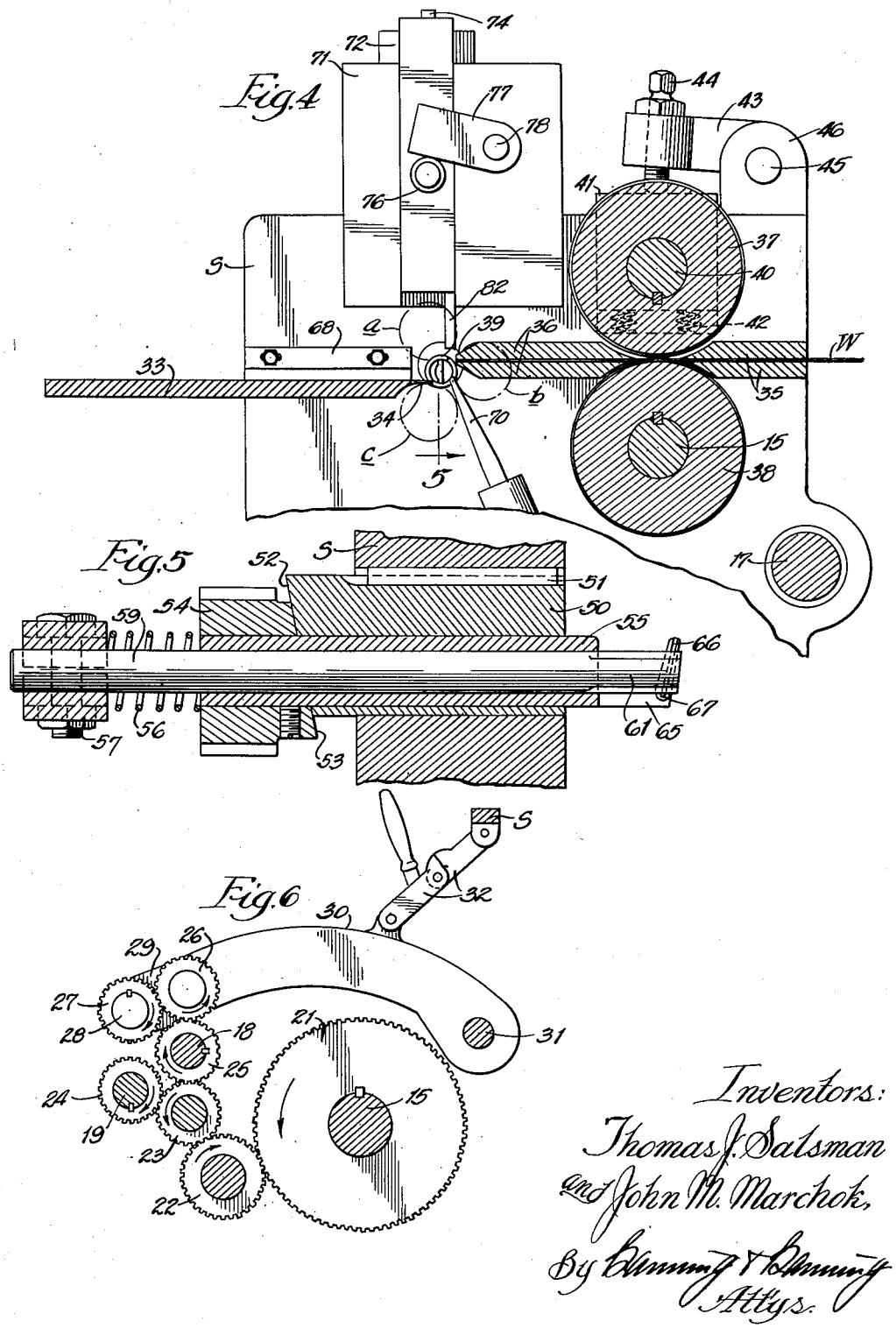

Feb. 1, 1938. T. J. SALSMAN ET AL 2,107,217
ART OF BOOKBINDING
Filed Aug. 6, 1936 5 Sheets-Sheet 5
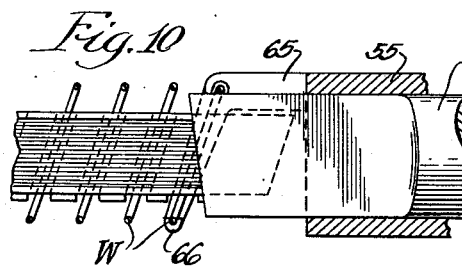
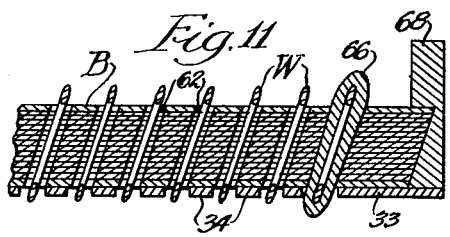
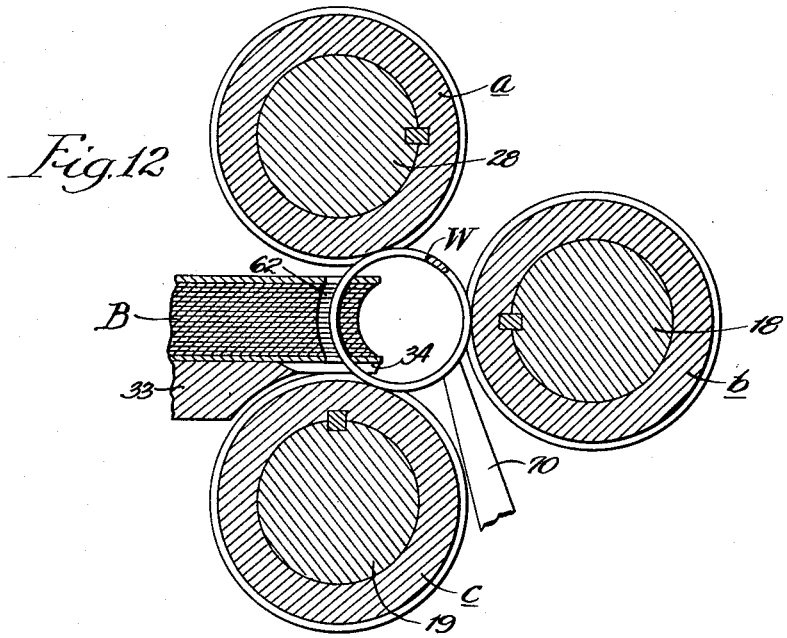
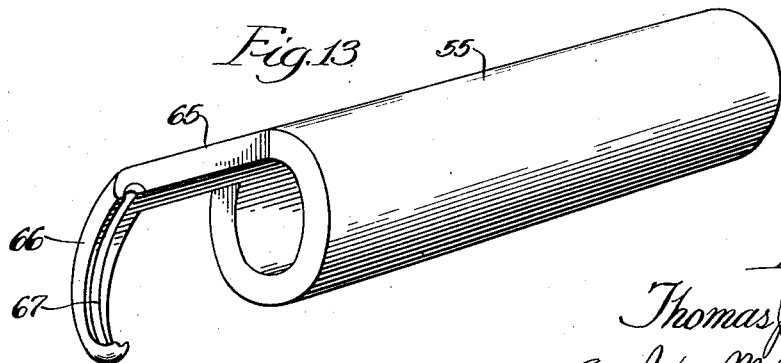
Inventors:
Thomas J. Salsman
and John M. Marchok,
By [signature]
Attys.

Patented Feb. 1, 1938

2,107,217

UNITED STATES PATENT OFFICE 2,107,217

ART OF BOOKBINDING

Thomas J. Salsman and John M. Marchok, Chicago, Ill., assignors to Rockwell-Barnes Company, Chicago, Ill., a corporation of Illinois Application August 6, 1936, Serial No. 94,645

7 Claims. (Cl. 11—1)

This invention which has to do with the art of bookbinding is concerned with a method and mechanism for concurrently forming and inserting a wire helix through a series of aligned passages adjacent an edge of a stack of leaves, with or without covers. Such a binding which is suitable for note books, publications, catalogs etc., is advantageous in that it permits free turning of the leaves (and covers, if used) through 360°. The improved features of this invention in so far as concerns the method employed was first disclosed in our application for patent filed May 14, 1936 under Serial No. 79,748.

In applying a wire helical binding to books it has been common practice to first produce a wire helix, to then thread the helix through a row of passages prepared for its reception adjacent a book edge, and finally to bend or deform the end coils of the helix to lock the binding in place. By contrast, the present method and mechanism forms the wire into a helix concurrently with its advance into the book passages wherein it may serve as a permanent binder for the leaves thereof. The row of passages may terminate remotely from the book sides, instead of closely adjacent thereto, as in present constructions. Also, if desired, one end of the wire helix may be bent or deformed automatically at the close of the binding operation. Such a binding is particularly adapted to a book having extended imperforate areas beyond the end passages opposite the terminals of the wire helix, all as explained in our application above referred to. The production and application of bookbindings according to our invention may be accomplished with greater facility and speed, and with assurance against accidental disassembly of the bindings once they are applied.

As an exemplification of mechanism which may be used in the practice of our invention, we have illustrated in the accompanying drawings certain views as follows:

Fig. 1 is a view in elevation of the front side of a forming and binding machine;

Fig. 2 is a plan view of the operating end of the machine;

Fig. 3 is a perspective view of a book prior to the binding operation;

Fig. 4 is a transverse section through the machine, taken on line 4—4 of Fig. 2;

Fig. 5 is an enlarged detail in section taken on line 5 of Fig. 4;

Fig. 6 which is a transverse section on line 6—6 of Fig. 2 shows the transmission for the guide rolls;

Figs. 7, 8, and 9 are details in enlarged section, taken about on line 4—4 of Fig. 2, showing the needle in two positions, and the shearing and forming bar in three successive stages of the binding operation;

Figs. 10 and 11 are details in section taken, respectively, on lines 10 and 11 of Fig. 8;

Fig. 12 is an enlarged detail in section on line 12—12 of Fig. 2; and

Fig. 13 is a view in perspective of the needle and supporting sleeve therefor.

Referring particularly to Figures 1 and 2, upon the machine bed are carried supports S for a main drive shaft 15 equipped at one end with a pulley 16, and for a cam shaft 17; also for rear and lower guide roll shafts 18 and 19, respectively, as well as other mechanisms hereinafter to be described. By a gear 21 carried on the drive shaft (see Fig. 6) motion is imparted to an idler gear 22 in mesh with a second idler gear 23 which in turn meshes with a gear 24 on the lower guide roll shaft 19 for imparting rotation thereto. In mesh also with the idler gear 23 is a gear 25 on the rear guide roll shaft 18, this latter gear meshing with an idler gear 26 which is in mesh with a gear 27 on an upper guide roll shaft 28. This latter shaft is mounted for rotation within an elongated bearing 29 (see Fig. 2) near the free end of a swinging arm 30 having a pivotal mounting 31 at a point toward the rear end of the machine. The idler gear 26 is also carried on the same arm in a position above the gear 25 on the rear guide roll shaft, the relationship being such that when this arm is upwardly swung, as with the aid of a toggle lever 32, the upper guide roll shaft is lifted away from its companion shafts, the gear 26 separating itself from the gear 25 below while remaining in mesh with the other gear 27.

Upon the shafts 28, 18 and 19 are mounted three grooved guide rolls a, b and c, respectively, their relative positions being clearly shown in Fig. 12. The work to be operated upon, here shown as a book B with covers, is supported upon a horizontal table 33 whose rearward edge lies proximate to the under guide roll c at a point close to its upper side. This edge terminates in a series of fingers 34 which extend over the lower guide roll so as to afford support for the book edge to be bound when advanced to a position between the upper and lower guide rolls. At one end of the rear guide roll b upon the side of the roll assembly opposite the table and about in line with the under side of the top roll a (see Fig. 4) are tandem guide blocks 35 and 36 each having a bore through which a wire W is adapted to be fed. These blocks lie end to end, slightly spaced to receive between them a pair of feed rolls 37 and 38 in a position to engage the wire upon its upper and lower sides respectively whereby to advance it through the blocks and out of the exit end 39 thereof which lies close to the book whose leaves (and covers) are to be bound.

The lower feed roll may be carried fast on the main drive shaft 15 by which it is operated. The upper feed roll, as shown, is mounted on a shaft 40 having a bearing in a block 41 which is slidingly guided for slight vertical movements in the center support S. As by means of springs 42 this block is normally urged upwardly to lift the feed roll 37 out of engagement with the wire. Forward advance of the wire can accordingly take place only when the block is moved downwardly counter to the tension of the springs. To accomplish this we may employ a bell crank mechanism comprising a weight arm 43 having an adjusting screw 44 in engagement with the upper face of the block, its fulcrum being a pivot pin 45 which is secured to ears 46 on the center support S. The bell crank includes also a depending power arm 47 which carries a roller 48 in engagement with a cam 49 on the shaft 17. By the means just described the upper feed roll will be depressed at intervals to cause advance of the wire for predetermined periods.

Affixed to the center support S is a mounting block 50 locked against rotation as by a spline 51 (see Fig. 5). One block end 52 is cammed for coaction with the cammed hub 53 of a gear 54 mounted non-rotatably on a sleeve 55 which is fitted through the block. Normally this gear is maintained with pressure against the block by a compression spring 56 which exerts opposing thrusts against the gear and a fixedly mounted arm 57. In mesh with the gear 54 is an actuating rack bar 58 (see Fig. 1) operable by control means (not shown) such as a treadle. The arm 57 affords a mounting for one end of a bar 59 which extends through the sleeve 55. In cross section this bar is round except in the region of its free end where it is changed to flat on one face 60 and convex on a reduced radius upon the opposite face 61 (see Figs. 7, 8, and 9). The convex bar face lies adjacent the ends of the table fingers 34 to provide a stop for the book. By reason of this convex face the end of the book where binding is to take place is concaved inwardly, thereby causing the registering series of aligned openings 62 extending transversely through the book to form arcuate passages therethrough.

The rotary and longitudinal positions of the sleeve 55 may be shifted by actuation of the rack bar 58, as already noted. At the end of this sleeve which is opposite the cam gear 54 we provide an extension arm 65 at whose extremity is carried one end of a pitched arcuate finger 66 extending through 180° or so forming a blunt-pointed bowed needle whose external contour about coincides with that of the sleeve itself. This needle constitutes in effect a forming die for producing a multiple-coil helix. In addition, and independently of the bar stop 59, the needle bow is such as to cause the book leaves to shift relatively to each other to positions where the openings 62 form passages which are arcuate from end to end. Interiorly this needle is provided with a groove 67 whose operative position is opposite the exit end of the guide block 36 so that the wire issuing therefrom enters the groove and then slides around through an arc of 180° or so to be formed into a helix having a series of coils of like pitch and diameter. The slant or pitch of the needle is such as to produce the desired distance between the several coils whose radius corresponds to that of the needle groove. This radius, it should also be noted, corresponds with that of the several arcuate passages through the book. At the commencement of the coil forming operation the sleeve 55 is brought to its initial position where the needle lies opposite an end passage of the book whose correct position upon the table is reached with the aid of an inclined side stop 68 (see Fig. 11) which shifts the leaves sufficiently to cause the arcuate passages 62 to be slanted in conformity with the pitch of the coils which comprise the helix. From this initial position (shown in Fig. 7) the needle is advanced into and through the end passage by a concurrent shifting and rotation of the sleeve 55 through 180° or so (see Fig. 8) following which the wire is fed forwardly into the needle to be thereby formed into a series of coils of like pitch and diameter. As this wire advance continues the leading end of the wire enters successively each of the aligned passages through the book until it has traversed the last passage whereupon the feeding operation is halted. In cooperation with the needle is a pitch regulator 70 which lies adjacent the exit end thereof in a position to deflect laterally each coil under formation to whatever extent is necessary for retention of the desired pitch. As the helix forms, its several coils are engaged by the revolving guide rolls (see Fig. 12) by which the wire advance is assisted and guiding of the leading edge thereof is assured into each of the slanting arcuate book passage in turn.

In a block 71 carried upon the center support we have provided a vertical slot, preferably undercut as best shown in Fig. 2, forming a guideway for a slidable bar 72 having if desired a dovetail cross section which interfits with the slot wherein it is reciprocably confined. A head 73 at the top of this bar (see Fig. 1) extends laterally to receive therethrough a rod 74 around which is coiled a compression spring 75 exerting against the head an upward thrust which tends to maintain the bar in an elevated position. A roller 76 upon one side of the bar is engaged by a crank 77 having a mounting on a shaft 78 to which is secured fast one end of a depending arm 79 equipped near its free end with a roller 80 in engagement with a cam 81 on the shaft 17. The timing of this shaft with relation to the associated mechanisms is such that the bar is pushed down by the crank immediately following the completion of a helix all of whose coils have been advanced through the book passages. At the lower end of the bar is a blade 82 coacting with the exit end of the guide block 36 to shear the wire when the bar descends, there being also at the bottom of this blade a groove 83 extending transversely thereacross and upwardly as at 84 upon the blade side which is remote from the guide block (see Figs. 7–9). With each shearing operation the wire end of the helix may also be bent radially, or substantially so, as shown in Fig. 9, when the blade is constructed in this manner.

In operation, the three guide rolls a, b and c, also the two wire feed rolls 37 and 38, may rotate continuously; longitudinal advance of the bar is accomplished manually; but most of the remaining mechanisms are subject to control of a clutch 85, which upon actuation will cause operation thereof in timed relation through one cycle only. With the hook leaves positioned properly upon the table, the side stop will cause the aligned passages adjacent the edge to be bound to be pitched in conformity with the wire coils to be formed. Bowing of these passages in arcuate form from end to end results from engagement of the leaf ends with the bar stop, or from insertion of the arcuate needle, or both. Advance of the needle into the first passage proceeds both longitudinally and rotatively of its axis of motion. The clutch is then engaged, whereupon the wire is fed forwardly and pushed into the coil forming die. Helical coils are thereupon formed and concurrently advanced through each of the succeeding book passages until the wire binding has reached its final position. The three guide rolls which receive between them the forming helix are rotated in the same direction and engage with the coils thereof to apply a pulling force thereto; in addition these guide rolls assure the forming of a helix all of whose coils have the same radius about a straight axis with the leading wire end correctly positioned to enter the next succeeding book passage. When the last passage has been traversed by the helix the wire advance is automatically halted and the shearing and forming blade then descends to cut the wire and, if desired, to bend in its trailing end. The movements of the mechanisms which perform these various operations are halted by a brake 86 upon completion of the binding in the book. Thereupon the needle is withdrawn from the first passage, the book is shifted sidewise to withdraw its helical coils from the bar-stop 59, the upper guide roll is lifted, and the book, completely bound, is removed from the table. These binding operations may follow one upon the other in rapid succession, the wire helix being formed and concurrently applied through the book passages without any manual handling thereof on the part of the attendant.

We claim:

1. Mechanism for binding a book of leaves having adjacent one end thereof a row of evenly spaced passages therethrough comprising means for stacking the leaves to render the book passages arcuate from end to end, an arcuate needle, means for moving the needle through one of the passages, and means for feeding a wire through the needle to form a helix having a series of coils spaced in conformity with the passages through the book whereby upon continued advance each coil is entered through one of the book passages to provide a binding therefor.

2. Mechanism for binding a book of leaves having adjacent one end thereof a row of evenly spaced passages therethrough comprising means for stacking the leaves to render the book passages arcuate from end to end, means for stacking the leaves to render the book passages pitched from side to side, an arcuate pitched needle, means for moving the needle through one of the passages, and means for feeding a wire through the needle to form a helix having a series of coils spaced and pitched in conformity with the passages through the book whereby upon continued advance each coil is entered through one of the book passages to provide a binding therefor.

3. Mechanism for binding a book of leaves having adjacent one end thereof a row of evenly spaced passages therethrough comprising a coil forming needle, means for positioning the needle in one of the book passages, and means for feeding a wire through the needle to form a helix the coils of which are extended successively through the book passages to afford a binding therefor.

4. Mechanism for binding a book of leaves having adjacent one end thereof a row of evenly spaced passages therethrough comprising a coil forming needle, means for positioning the needle in one of the book passages, means for feeding a wire through the needle to form a helix, and a plurality of guide rolls engaging the helix acting to maintain the coils thereof at a uniform radial distance from a straight axis therewithin whereby the leading end of the helix will be guided successively into each of the book passages.

5. Mechanism for binding a book of leaves having adjacent one end thereof a row of evenly spaced passages therethrough comprising a coil forming needle, means for positioning the needle in one of the book passages, means for feeding a wire through the needle to form a helix, a plurality of guide rolls engaging the helix acting to maintain the coils thereof at a uniform radial distance from a straight axis therewithin whereby the leading end of the helix will be guided successively into each of the book passages, means to sever the wire adjacent the needle when the helix is completed, and means for withdrawing the needle from the book passage and simultaneously disengaging itself from the wire coil therewithin.

6. Mechanism for binding a book of leaves having adjacent one end thereof a row of evenly spaced passages therethrough comprising a pitched coil forming needle of arcuate shape with a groove extending lengthwise thereof upon its inner face, means to advance the needle within and retract the needle from one of the book passages, and means to feed a wire along the groove within the needle and through the book passage to form a succession of coils each of which in turn is advanced within and through the remaining book passages whereby to afford a binding therefor.

7. Mechanism for binding a book of leaves having adjacent one end thereof a row of evenly spaced passages therethrough comprising a coil forming die receivable in one of the book passages, means for pushing a wire into the die to form a helix the coils of which successively traverse other of the book passages to afford a binding therefor, and means engaging with the helical coils acting to pull the wire and guide the leading end thereof into the several book passages in turn.

THOMAS J. SALSMAN.
JOHN M. MARCHOK.